United States Patent
Kamegawa

(10) Patent No.: US 7,373,450 B2
(45) Date of Patent: May 13, 2008

(54) MULTI-LAYER BUS SYSTEM HAVING A BUS CONTROL CIRCUIT

(75) Inventor: Hideki Kamegawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 128 days.

(21) Appl. No.: 11/331,170

(22) Filed: Jan. 13, 2006

(65) Prior Publication Data
US 2006/0155902 A1    Jul. 13, 2006

(30) Foreign Application Priority Data
Jan. 13, 2005    (JP)    ............... 2005-006778

(51) Int. Cl.
*G06F 13/00*    (2006.01)
(52) U.S. Cl. ............... 710/316; 710/110; 710/306; 710/317
(58) Field of Classification Search ............... 710/110, 710/316, 317, 306
See application file for complete search history.

(56) References Cited

U.S. PATENT DOCUMENTS

| | | | |
|---|---|---|---|
| 5,555,543 A * | 9/1996 | Grohoski et al. | 709/209 |
| 7,219,178 B2 * | 5/2007 | Harris et al. | 710/110 |
| 2004/0123011 A1 * | 6/2004 | Murayama et al. | 710/305 |
| 2005/0198429 A1 * | 9/2005 | Hoshi et al. | 710/316 |
| 2005/0235084 A1 * | 10/2005 | Nariai | 710/110 |

OTHER PUBLICATIONS

"Multi-layer AHB Overview", DV10045B, May 2004, published by ARM, pp. 1-8.

* cited by examiner

*Primary Examiner*—Glenn A. Auve
(74) *Attorney, Agent, or Firm*—Donald R. Studebaker

(57) ABSTRACT

A multi-layer bus system includes an interconnect matrix, bus slaves, bus masters and a bus control circuit. The interconnect matrix has master connection ports and slave connection ports, and connects one of the master connection ports to one of the slave connection ports in response a control signal. The slaves are connected to the slave connection ports, respectively. The bus masters includes a priority bus master connected to one of the master connection ports and a non-priority bus master. The priority bus master generates a bus demand signal when it needs a real-time operation. The bus control circuit is connected between the non-priority bus master and the other master connection ports. The bus control circuit disconnects the non-priority bus master to the other master connection ports in response to the bus demand signal.

11 Claims, 5 Drawing Sheets

MULTI-LAYER BUS SYSTEM HAVING A BUS CONTROL CIRCUIT

BACKGROUND OF THE INVENTION

The present invention relates to the bus control circuit in a semiconductor integrated circuit and the bus control method, and the multi-layer bus system that used the AHB bus especially.

As to the conventional technology, there is described in "Multi-layer AHB Overview" (DVI0045 B, May 2004) published by ARM. The disclosed system includes two or more bus masters that are able to access simultaneously to two or more bus slaves. It is making such concurrent access possible, the bus zone as a system is extended, and system performance is raised.

In the conventional multi-layer bus system, the connection module for connecting two or more masters and slaves is performing processing which switches a layer (bus master) for every transaction with the round ROBIN system (namely, system which assigns a processing demand in order to two or more masters which performed the access demand), when an access demand occurs from two or more bus masters simultaneously to the same bus slave.

However, in the conventional multi-layer bus system, the system does not arbitrate for stopping other bus masters, like the conventional single layer bus system while a certain bus master operates, when two or more bus masters operated simultaneously. Therefore, there is a problem that reservation (a specific bus master should access the number-of-times bus slave of fixed in a fixed period) of the real-time operation of a specific bus master became difficult.

For example, in the multi-layer bus system having three layer composition, when the bus master of each layer advances an access demand to the same bus slave simultaneously, in order that the above-mentioned connection module may switch a layer (bus master) for every transaction of a bus slave (round ROBIN system), even if it is going to give priority and is going to access a bus slave for the real-time operation of a specific bus master. Since a layer changed by one transaction, access required for a fixed period of the bus master which needs a real-time operation was not completed, but it had the problem that a real-time operation became difficult. For this reason, there was the necessity of interrupting operation of the bus master of other layers by soft processing.

In the highly efficient system LSI for multimedia, there was much processing (a sound, image processing) of which a real-time operation is required, and when a multi-layer bus system was applied to such a system LSI, reservation of a real-time operation had become a problem.

SUMMARY OF THE INVENTION

It is an object of the present to make possible the real-time operation of a specific bus master in a multi-layer bus system.

A multi-layer bus system according to the present invention includes an interconnect matrix, bus slaves, bus masters and a bus control circuit. The interconnect matrix has master connection ports and slave connection ports, and connects one of the master connection ports to one of the slave connection ports in response a control signal. The slaves are connected to the slave connection ports, respectively. The bus masters includes a priority bus master connected to one of the master connection ports and a non-priority bus master. The priority bus master generates a bus demand signal when it needs a real-time operation. The bus control circuit is connected between the non-priority bus master and the other master connection ports. The bus control circuit disconnects the non-priority bus master to the other master connection ports in response to the bus demand signal.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE INVENTION

Preferred embodiments of the present invention will hereinafter be described in detail with reference to the accompanying drawings. In addition, each drawing is roughly shown in the grade which can understand this invention.

(1) First Embodiment

Figure 1:
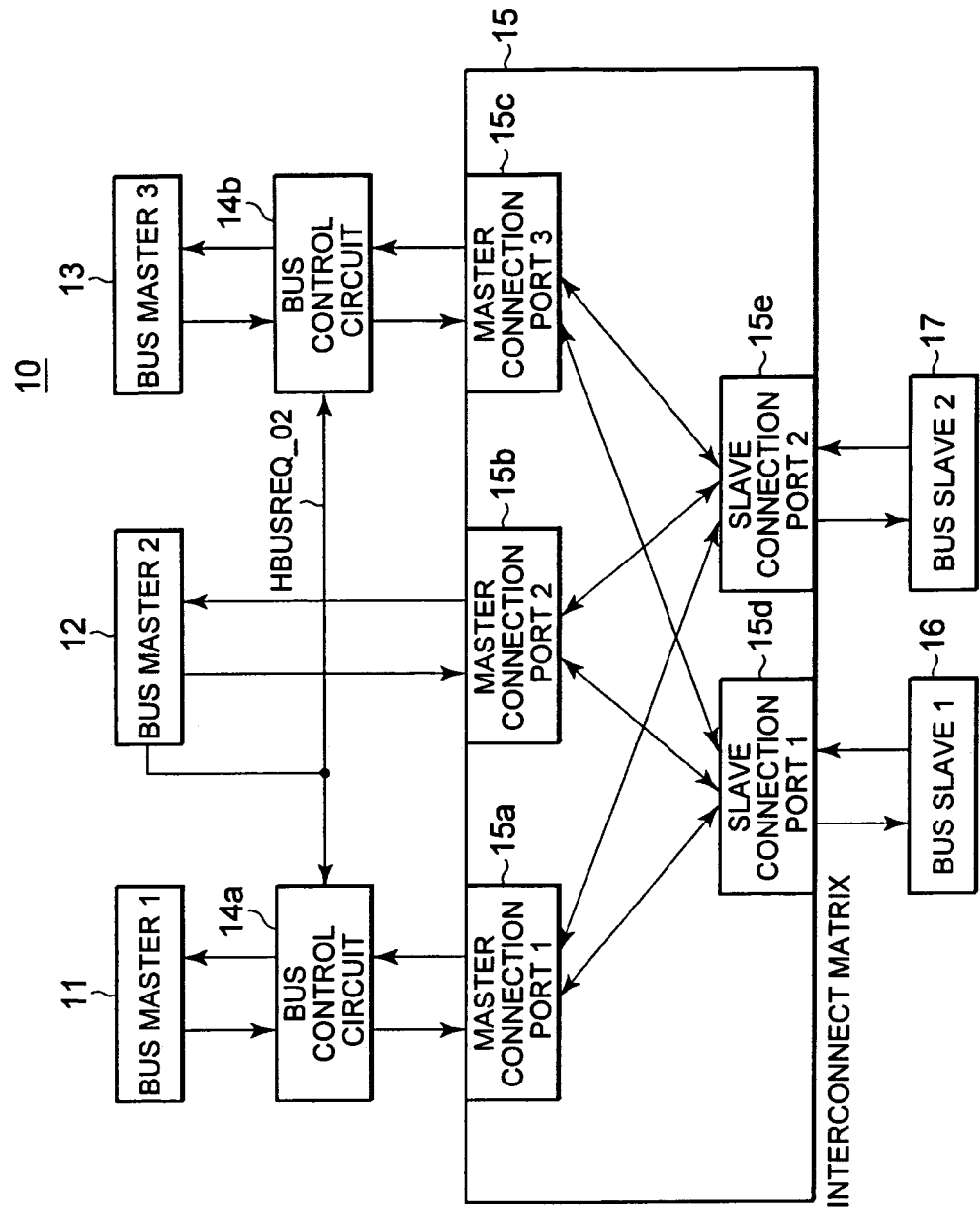
FIG. 1 is a block diagram showing the composition of the multi-layer bus system in the first embodiment of the present invention.

FIG. 1 is a block diagram showing the composition of the multi-layer bus system according to a first embodiment of the present invention. The system 10 includes bus control circuits 14a and 14b between an Interconnect Matrix module (a connection module is constituted) 15 and a first bus masters 11 and a third bus master 13. The Interconnect Matrix module 15 includes first-to third master connection ports 15a, 15b and 15c and first and second slave connection ports 15d and 15e. The first and third master connection ports 15a and 15c are connected to the first and third bus masters 11 and 13 through bus control circuits 14a and 14b, respectively. The second master connection port 15b is connected to the second bus master 12 directly. The first and second slave connection ports 15d and 15e are connected to first and second slaves 16 and 17, respectively. The interconnect matrix connects one of the master connection ports with one of the slave connection ports in response a control signal received from outside (not shown). A bus demand signal (HBUSREQ_02) from a second bus master 12 which needs a real-time operation is inputted into an input terminal of the bus control circuits 14a and 14b.

Figure 2:
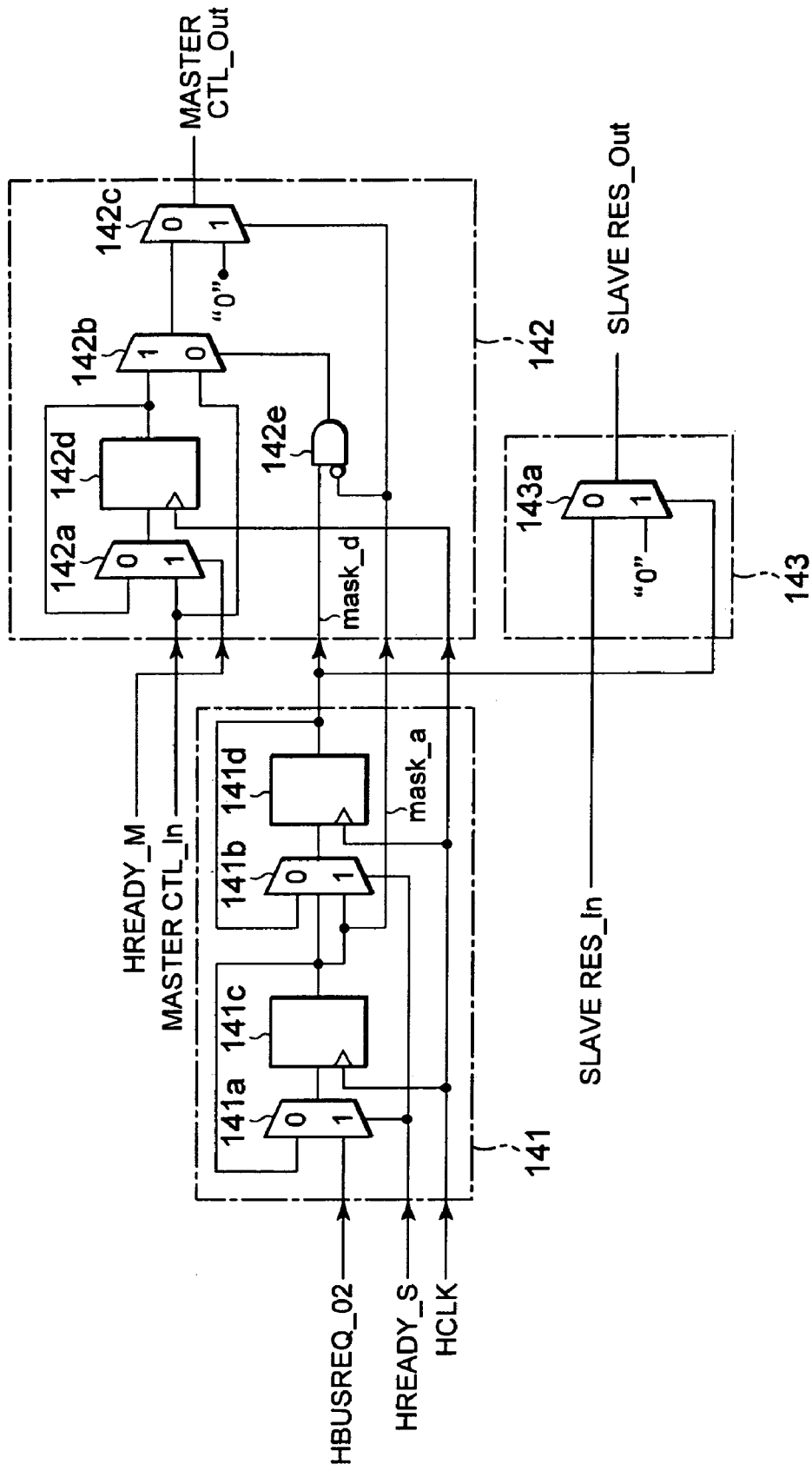
FIG. 2 is a block diagram showing an internal composition of a control circuit.

FIG. 2 is a block diagram showing the composition of the bus control circuits 14a and 14b. The control circuit includes a first control circuit 141, a second control circuit 142, and a third control circuit 143.

The first control circuit 141 includes selectors 141a and 141b and flip-flops 141c and 141d. The first control circuit 141 receives a HREADY_S signal which is a completion signal of transmission outputted from the connection module 15 to the bus control circuit and a bus demand signal (HBUSREQ_02) from a high priority bus master (in this embodiment, bus master 2). The first control circuit 141 generates mask signals (mask_a and mask_d) which synchronized with the clock signal (HCLK).

The second control circuit 142 includes selectors (142a, 142b, 142c), a flip-flop 142d and logical product circuit 142e which has an inverted input terminal. The second control circuit 142 receives a control input signal from the bus master (They are signals, such as HADDR and HTRANS. However, they are expressed collectively as a single signal MASTER CTL_In in FIG. 2), the HREABY_M signal which is a READY signal to the bus master generated by a third control circuit 143, and the mask signal (mask_a, mask_d). The second control circuit 142 output a signal (MASTER CTL_Out) to the connection module 15.

The third control circuit 143 includes a selector 143a. The third control circuit 143 receives a response input signal (They are signals, such as. HREADY_S and HRDATA. However, they are expressed collectively as a single signal SLAVE RES_In) from the connection module 15, and the mask signal. mask_d. The third control circuit 143 generates a response output signal (SLAVE RES_Out) to slaves, such as a HREADY_M signal.

Figure 4:
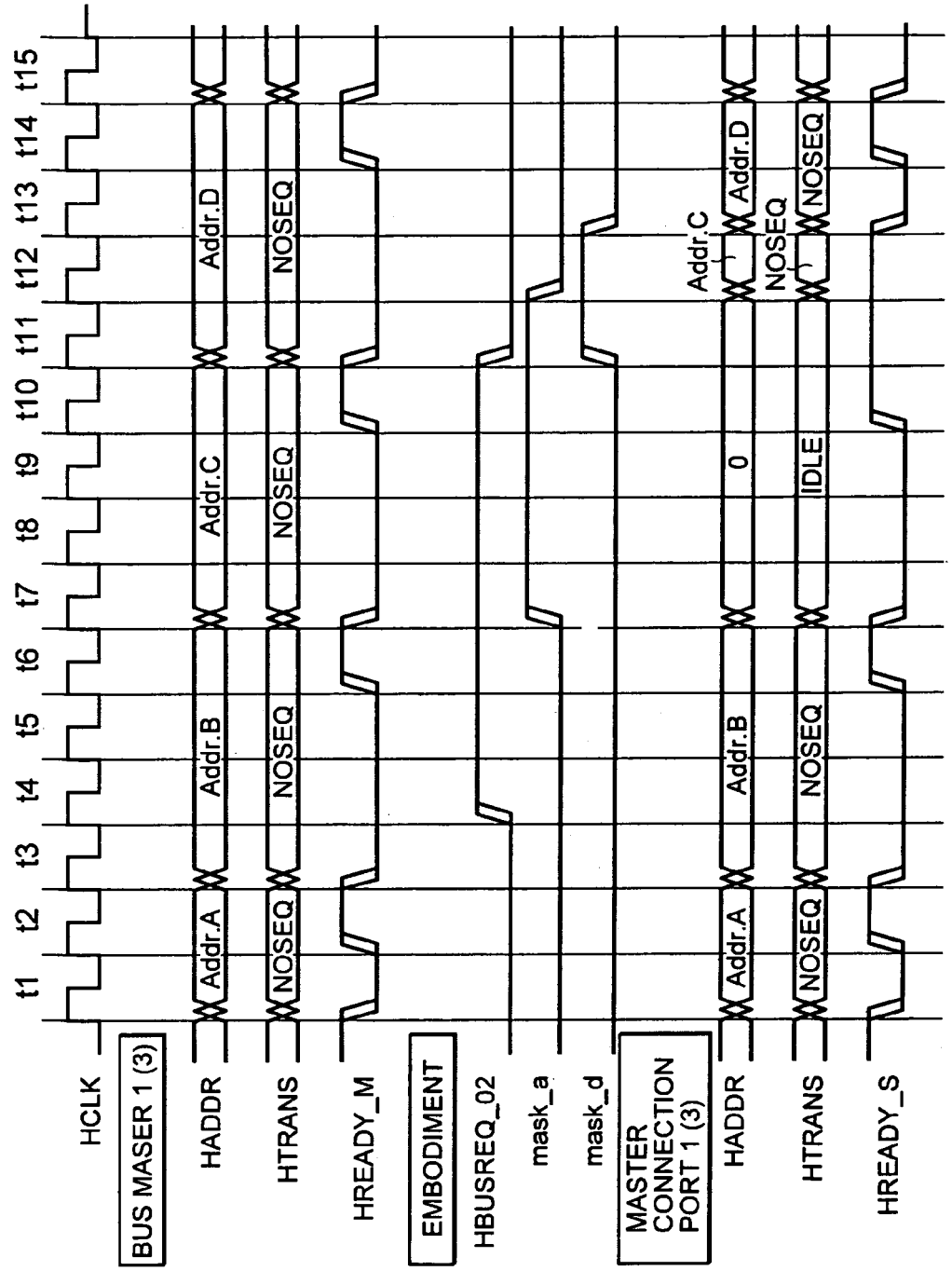
FIG. 4 is a timing chart showing an operation in case the real-time operation demand signal from a bus master 2 exists.

In the first embodiment, the second bus master demands the real-time operation. As shown in FIG. 4, the mask_a signal is a signal which synchronized HBUSREQ_02 signal by the HREADY_S signal, and changes to a timing by which the address phase of AHB is started. The mask_d signal is a signal which synchronized the mask_a signal by the HREADY_S signal again, and changes by a data phase of a transaction from which the mask_a signal is changed.

An operation of the multi-layer bus system of the first embodiment is explained hereafter. First, if the second bus master requires a bus right and the bus demand signal (HBUSREQ_02) is generated, the bus demand signal is inputted into the bus control circuits 14a and 14b. Then, an access to bus slaves of bus masters other than the second bus master (layer) is masked by carrying out at the following steps.

(A1) Where the bus demand signal (HBUSREQ_02) from the second bus master is asserted, the mask_a signal of FIG. 2 turns effective and the output signal (MASTER CTL_Out) from the bus control circuit to the connection module 15 is masked as "0." In an AHB protocol, since the IDLE access state over a bus slave is shown when the HTRANS signal has level "0," an access to the bus slave is not occurred.

(A2) Where the mask_d signal is asserted (having level "1"), the slave response signal (SLAVE RES_Out) to the first bus master (or the third bus master) is masked as "0." In an access cycle (cycle of HADDR=Addr. B of FIG. 4) immediately before the master control signal output (MASTER CTL_Out) to the connection module 15 is masked as "0" by the mask_a signal, the slave response signal (SLAVE RES_Out) during HADDR=Addr. B is the slave response signal (SLAVE RES_In) from a master connection port (15a, 15C) is inputted into the first bus master (or the third bus master), since the mask_d signal is "0."

(A3) From the next cycle (t11), the mask_d signal is set to "1." The slave response signal (SLAVE RES_In) to the first bus master (or the third bus master) is masked as "0." The slave response signal (SLAVE RES_Out) which is masked as "0" is outputted from the third control circuit 143 to the first bus master or the third bus master. Then, an access demand from the first bus master or the third bus master to the slave is prohibited.

The bus demand signal (HBUSREQ_02) from the second bus master is negated. An operation in the case of canceling an access prohibition state to the first and third bus masters is as follows.

(B1) Where the bus demand signal (HBUSREQ_02) is negated and the mask_a signal is set to "0," the mask_d signal does not change with level "1" until the following HREADY_S signalis received. Therefore, the master control signal (MASTER CTL_In) stored at the flip-flop 142d (HADDR=Addr. C in FIG. 4) is selected by the selector 142b in the control circuit 142 shown in FIG. 2 is outputted as a MASTER CTL_Out signal (HADDR).

(B2) The HADDR=Addr. C is issued to the connection module 15 (that is, the signal HREADY_S has a level "1"), the mask-d signal is set to "0." The output signal (HADDR, HTRANS) from the first and third bus masters is outputted to the connection module 15 as the output signal (MASTER CTL_Out) from the second control circuit 142 shown in FIG. 2. At this time, the slave response signal (SLAVE RES_In) to the bus master is cancelled since the mask_d signal is set to "0." Therefore, the slave response signal (SLAVE RES_In) is outputted from the third control circuit 143 as an output signal (SLAVE RES_Out).

As explained above, during the second bus master demands the bus right, the access of the first and third bus masters is prohibited (masked) by the bus control circuits 14a and 14b and the second bus master can exclusively operate. When the demand of the bus right is canceled, an operation of the first and third bus masters is resumed.

Figure 3:
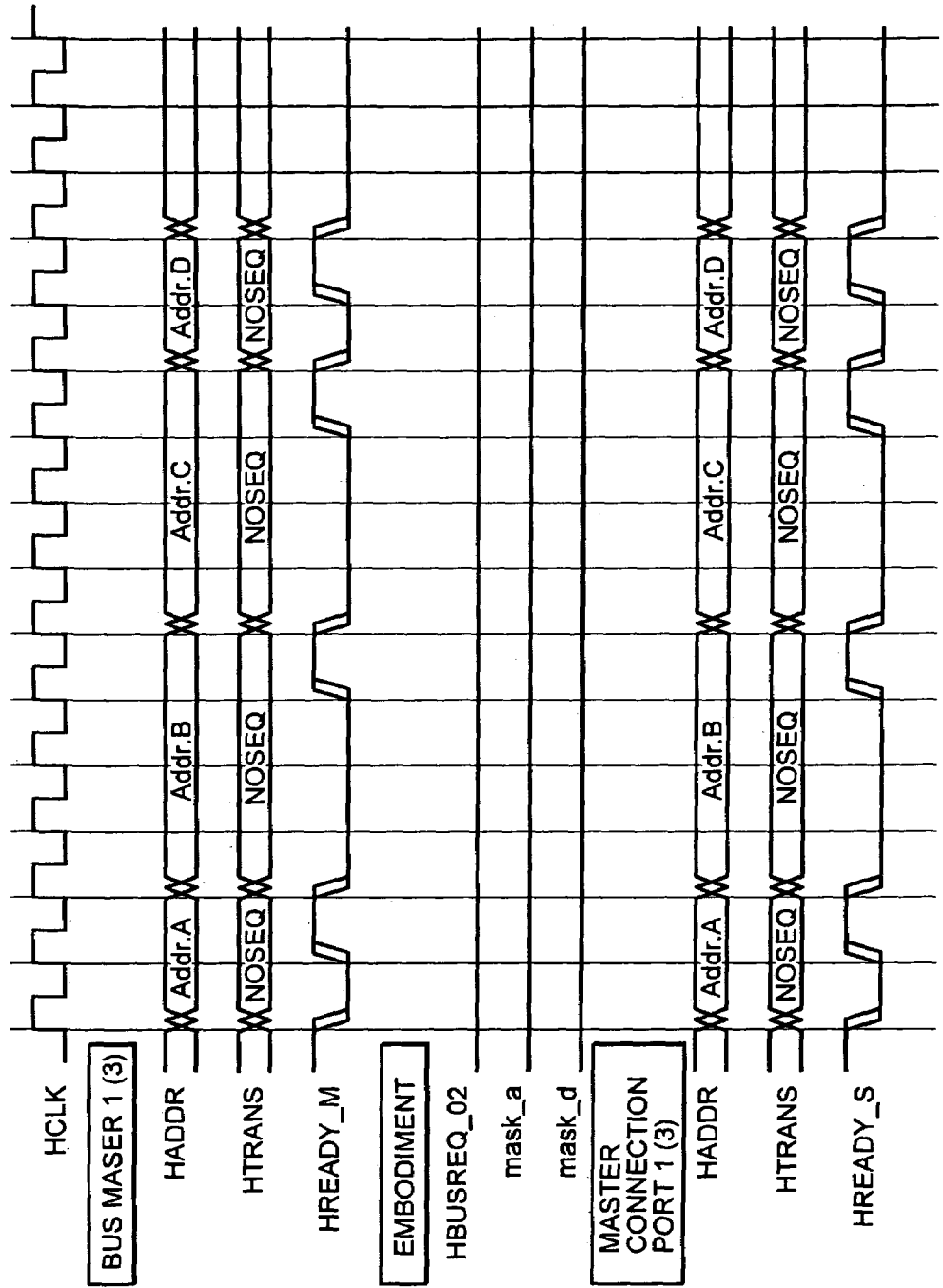
FIG. 3 is a timing chart showing an operation in case the real-time operation demand signal from a bus master 2 does not exist.

When the real-time operation demand signal from the second bus master does not exist, as shown in FIG. 3, the first and third bus masters can access to the slaves equally also under a control of the connection module.

As explained above, the following effects are acquired in the first embodiment.

(a) In case the bus master of a specific layer accesses, it becomes possible to carry out the mask of the access of the bus master of other layers, and it becomes possible to perform the real-time operation of a specific bus master.

(b) Since hardware is made to perform processing which carries out the mask of the operation of other bus masters, the load of software is mitigated.

(c) Since the procedure which forbids/resumes access of a bus master becomes unnecessary by software, it becomes possible to shorten the period to resumption of other bus masters of operation after the access end of the bus master which performs a real-time operation.

(2) Second Embodiment

Figure 5:
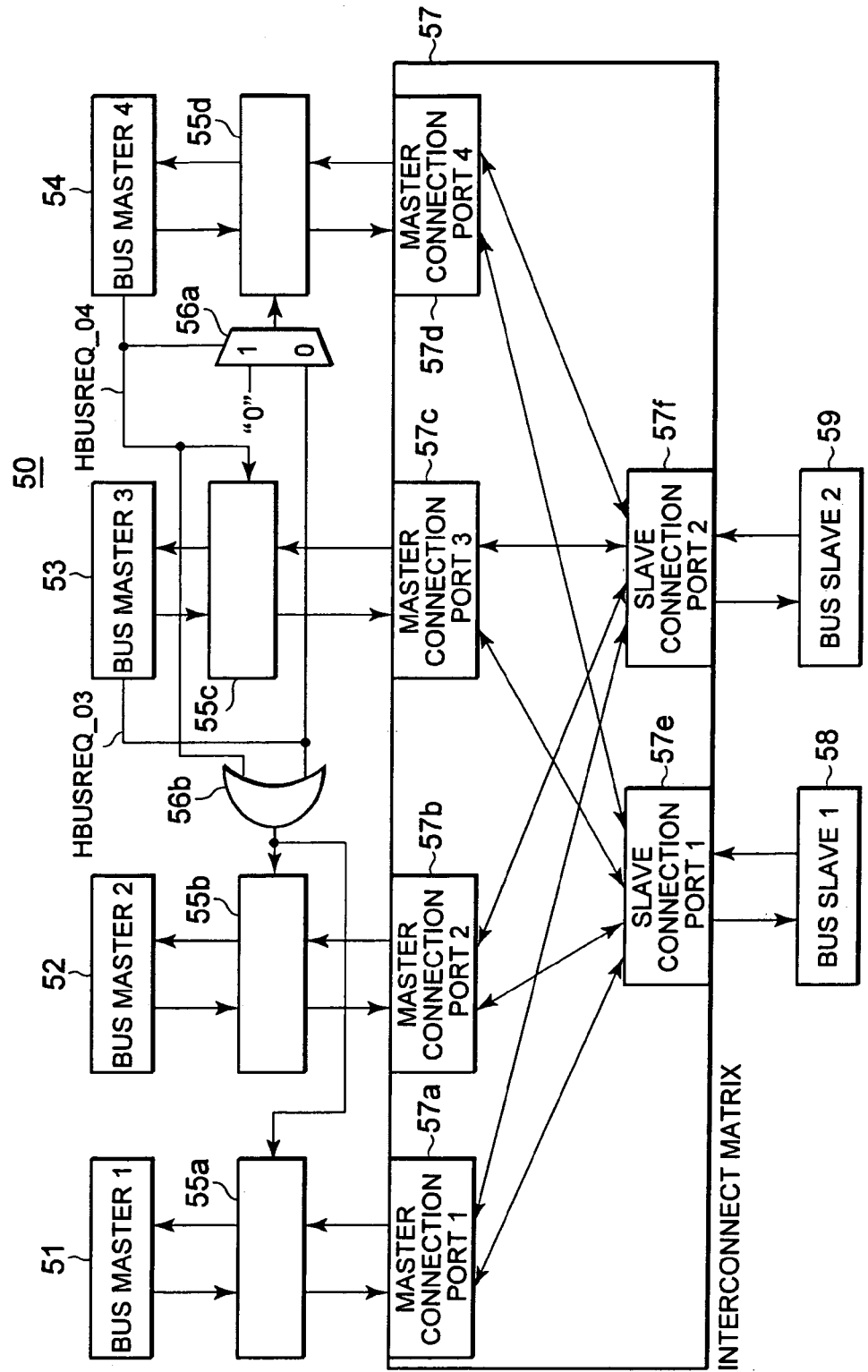
FIG. 5 is a block diagram showing the composition of the multi-layer bus system in the second embodiment of the present invention.

FIG. 5 is a block diagram showing the composition of the multi-layer bus system in the second embodiment of the present invention. The system 50 includes bus control circuits 55a and 55d between an Interconnect Matrix module (a connection module is constituted) 57 and first to fourth bus masters 51 to 54, respectively. The Interconnect Matrix module 55 includes first to fourth master connection ports 57a to 57d and first and second slave connection ports 57e and 57f. The first to fourth master connection ports 55a to 55d are connected to first to fourth bus control circuits 55a and 55d, respectively. The first and second slave connection ports 57e and 57f are connected to first and second slaves 58 and 59, respectively.

The bus demand signal (HBUSREQ_04) which a the real-time operation from the fourth bus master 54 is inputted to an input terminal of the third control circuit 55c, a selection signal input terminal of a selector 56a, and one input terminal of a two input logical sum gate circuit 56b. The bus demand signal (HBUSREQ_03) which needs a real-time operation from the third bus master 53 is inputted to the other input terminal of the tow input logical sum gate circuit 56b, an input terminal of the selector 56a that is chosen when a signal received to the selection signal input terminal has an invalid level. An output terminal of the two input logical sum gate circuit 56b is connected to an input terminal of the first and second control circuits 55a and 55b. An output terminal of the selector 56 is connected to an input terminal of the fourth control circuit 55d.

An operation of the multi-layer bus system of the second embodiment is explained hereafter. In the second embodiment, the third and fourth bus masters 53 and 54 need a real-time operation.

(C1) In case neither of the third and fourth bus masters 53 and 54 output a demand of the bus right In this case, a normal operation is performed and any bus master can be equally accessed to the bus slave.

(C2) In case where the fourth bus master 54 requires the bus right for the real-time operation Since the selector 56a outputs a signal having "0" level in response to a selection signal having "1" level, the fourth bus master 54 can access to the bus master as the normal operation. On the other hand, since a level of the bus demand signal (HBUSREQ_04) from the fourth bus master 54 turns to "1," each of the input terminals of the first to third control circuit 55a to 55c receive a signal having "1" level. Therefore, the accesses to the bus slave from the first to third bus masters are temporarily masked like the first embodiment.

(C3) In case where only the third bus master 53 requires the bus right for the real-time operation Since the bus demand signal (HBUSREQ_04) from the fourth bus master 54 has "0" level, the third control circuit 55c receives a signal having "0" level. On the other hand, corresponding to the selection signal having "0" level, the selector 56a outputs the bus demand signal (HBUSREQ_03="1") from the third bus master 53 to the input terminal of the fourth control circuit 55d. Further, since an output signal having "1" level from the two input logical sum gate circuit 56b is inputted into the input terminal of the first and second control circuits 55a and 55b, the accesses to the bus slave from the first, second and fourth bus-masters 51, 52, and 54 are masked when the bus demand signal (HBUSREQ_03) from the third bus master 53 is effective.

(C4) In case where both of the third and fourth bus master 53 and 54 require the bus right for the real-time operation simultaneously Since the bus demand signal (HBUSREQ_04) from the fourth bus master 54 has "1" level, the selector 56a does not select the bus demand signal (HBUSREQ_03=1) from the third bus master 53 but a signal having "0" level. Therefore, the accesses to the bus slave from the first to third bus masters are temporarily masked like the case (C2).

As explained above, even when two or more bus masters which need a real-time operation exist, it becomes possible by having established the arbitration circuits (56a, 56b) for arbitrating the bus right demand to perform access control to the bus slave in an order according to the priority set up beforehand.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A multi-layer bus system comprising:
   an interconnect matrix having a plurality of master connection ports and a plurality of slave connection ports, the interconnect matrix connecting one of the master connection ports to one of the slave connection ports in response to a control signal received thereto;
   a plurality of bus slaves each of which is connected to one of the slave connection ports, respectively;
   a plurality of bus masters including a priority bus master connected to one of the master connection ports and a non-priority bus master, the priority bus master generating a bus demand signal when the priority bus master needs a real-time operation; and
   a bus control circuit connected between the non-priority bus master and of the other master connection ports, the bus control circuit disconnecting the non-priority bus master from said other one of said master connection ports in response to the bus demand signal.

2. A multi-layer but system according to claim 1, wherein the bus control circuit includes
   a first control circuit generating a mask signal in response to the bus demand signal;
   a second control circuit connected to the first control circuit, the non-priority bus master and said one of the other master connection ports, the second control circuit receiving an input signal from the non-priority bus master and outputting either the input signal or an inactive signal in response to the mask signal; and
   a third control circuit connected to the first control circuit and said one of the other master connection ports, the third control signal generates an output signal to said one of the other master connection ports in response to the mask signal and a signal received from said one of the other master connection ports.

3. A multi-layer bus system according to claim 2, wherein the first control circuit includes a selector and a flip-flop.

4. A multi-layer bus system according to claim 2, wherein the second control circuit includes a selector and a flip-flop.

5. A multi-layer bus system according to claim 4, wherein the second control circuit flasher includes a gate circuit.

6. A multi-layer bus system according to claim 2, wherein the third control circuit includes a selector.

7. A multi-layer bus system comprising: an interconnect matrix having a plurality of master connection ports and a plurality of slave connection ports, the interconnect matrix connecting one of the master connection ports to one of the slave connection ports in response to a control signal received thereto;
   a plurality of bus slaves each of which is connected to one of the slave connection ports, respectively,
   a plurality of bus masters including a first priority bus master, a second priority bus master and a non-priority bus master, the first priority bus master generating a first bus demand signal when the first priority bus master needs a real-time operation, the second priority bus master generating a second bus demand signal when the second priority bus master needs the real-time operation;
   a plurality of bus control circuits connected between the bus masters and the master connection ports, respectively, the bus control circuits disconnecting the bus masters from the master connection ports in response to a signal received thereto; and a bus demand signal arbitration circuit connected to the first and second priority bus masters and the bus control circuits the bus demand signal arbitration circuit selectively outputting an inactive signal to the bus control circuits in response to the first and second bus demand signals.

8. A multi-layer bus system according to claim 7, wherein the bus demand signal arbitration circuit includes a selector and a gate circuit.

9. A multi-layer bus system according to claim 8, wherein the selector has a first input terminal connected to receive the inactive signal, a second input terminal connected to receive the second bus demand signal, a selection input terminal connected to receive the first bus demand signal, and an output terminal connected to one of the bus control circuits connected to the first priority bus master.

10. A multi-layer bus system according to claim 9, further comprising: an OR circuit having a first input terminal connected to receive the first bus demand signal, a second input terminal connected to receive the second bus demand signal, and an output terminal connected to one of the bus control circuits connected to the non-priority bus master.

11. A multi-layer bus system according to claim 8, wherein the gate circuit is an OR gate circuit.

* * * * *